(12) United States Patent
Pfeffer et al.

(10) Patent No.: US 11,890,692 B2
(45) Date of Patent: Feb. 6, 2024

(54) MATERIAL DEPOSITION FOR FLUID NOZZLE JOINTS

(71) Applicant: Delavan Inc., West Des Moines, IA (US)

(72) Inventors: Brett A. Pfeffer, Granger, IA (US); Jason Ryon, Carlisle, IA (US); Pete J. Schnoebelen, West Des Moines, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 5 days.

(21) Appl. No.: 17/494,584

(22) Filed: Oct. 5, 2021

(65) Prior Publication Data

US 2023/0104816 A1    Apr. 6, 2023

(51) Int. Cl.
| | |
|---|---|
| B23K 1/00 | (2006.01) |
| B23K 31/02 | (2006.01) |
| B23P 15/00 | (2006.01) |
| B23K 26/342 | (2014.01) |
| B23K 101/06 | (2006.01) |
| F23R 3/28 | (2006.01) |

(52) U.S. Cl.
CPC .......... *B23K 1/0018* (2013.01); *B23K 31/027* (2013.01); *B23P 15/00* (2013.01); *F23R 3/28* (2013.01); *B23K 26/342* (2015.10); *B23K 2101/06* (2018.08); *F02M 2200/80* (2013.01); *F23R 2900/00018* (2013.01)

(58) Field of Classification Search
CPC .. Y10T 29/49444; F16L 43/001; B23P 15/00; B23P 2700/13; B23K 1/0018; B23K 26/0093; B23K 26/342; B23K 31/027; B23K 2101/001; B23K 2101/06; B23K 2101/10; F02M 61/168; F02M 2200/80; F02M 2200/8069; F02M 2200/8084; F23R 3/28; F23R 3/286; F23R 3/30; F23R 3/32; F23R 2900/00018; F23D 2900/11101

See application file for complete search history.

(56) References Cited

U.S. PATENT DOCUMENTS

| | | | |
|---|---|---|---|
| 7,506,510 B2 | 3/2009 | Thomson | |
| 2013/0227951 A1* | 9/2013 | Krichever | F02C 7/22 29/889.22 |
| 2013/0298403 A1* | 11/2013 | Thomson | B23K 26/32 29/890.09 |

(Continued)

FOREIGN PATENT DOCUMENTS

| | | | | |
|---|---|---|---|---|
| CN | 111112952 A | * | 5/2020 | ............. B23P 15/00 |
| CN | 112663051 A | | 4/2021 | |

OTHER PUBLICATIONS

Translation of CN-111112952-A (Year: 2020).*

(Continued)

*Primary Examiner* — Matthew P Travers
(74) *Attorney, Agent, or Firm* — Locke Lord LLP; Joshua L. Jones; Gabriella D'Angelo

(57) ABSTRACT

A method of making a fluid injection component for a gas turbine engine includes depositing material onto a piece of tube stock. The method includes machining an elbow into the deposited material, wherein machining the elbow includes forming a braze joint surface in the deposited material. Depositing can include laser cladding the material onto the piece of tube stock.

11 Claims, 4 Drawing Sheets

(56) References Cited

U.S. PATENT DOCUMENTS

| | | |
|---|---|---|
| 2015/0343565 A1* | 12/2015 | Andre ................. B23K 26/342 29/416 |
| 2016/0325369 A1 | 11/2016 | Prociw et al. |
| 2018/0112936 A1 | 4/2018 | Konopacki et al. |
| 2018/0298824 A1* | 10/2018 | Matsuyama ............ F23R 3/286 |
| 2019/0292987 A1 | 9/2019 | Goeddeke et al. |
| 2021/0172341 A1 | 6/2021 | Fryer |

OTHER PUBLICATIONS

Partial European Search Report dated Feb. 20, 2023, issued during the prosecution of European Patent Application No. EP 22199656.4.
Extended European Search Report dated Jun. 15, 2023, issued during the prosecution of European Patent Application No. EP 22199656.4.

* cited by examiner

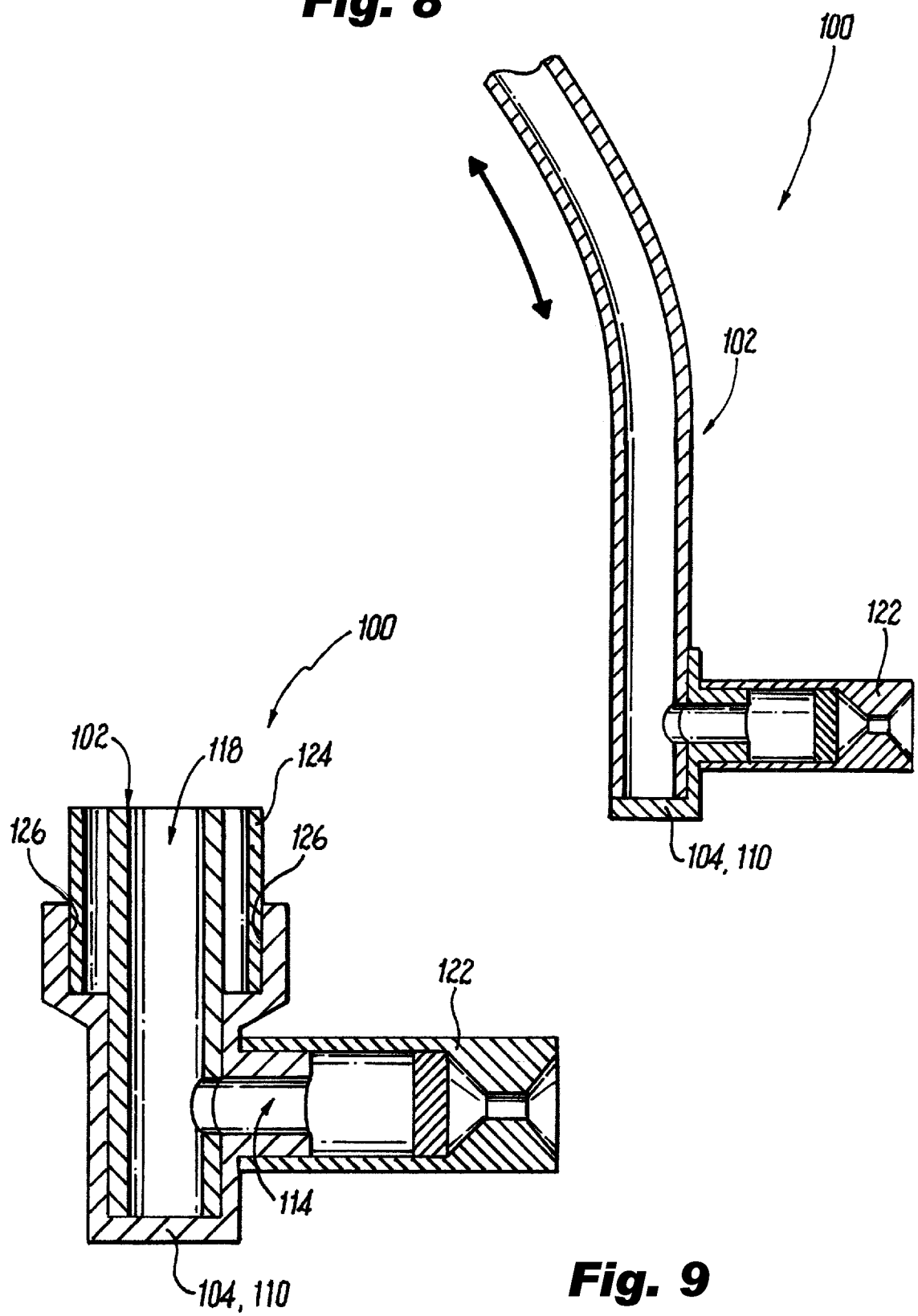

MATERIAL DEPOSITION FOR FLUID NOZZLE JOINTS

BACKGROUND

1. Field

The present disclosure relates generally to fluid injection components, and more particularly to fluid injectors for gas turbine engines.

2. Description of Related Art

Fluid nozzles are often perpendicular to the fluid feed tube in fluid injectors. It has long been a challenge to bend a tight radius into a fluid tube and keep the bend suitable for joining to the fluid nozzle. Often there is an intermediate elbow piece part which must exist between the fluid tube and the fluid nozzle. This elbow piece adds extra part count and cost, as the elbow and all the parts it joins must be precision machined and joined together. Also, certain thicknesses in the joint components must be available to allow for brazing and welding, which adds extra weight. One possible solution would be to omit the elbow piece, and use a very thick tube for the fluid tube. But to machine away the excess material along the length of the tube would be expensive and would generate considerable wasted material.

The conventional techniques have been considered satisfactory for their intended purpose. However, there is an ever present need for improved systems and methods for fluid nozzle joints. This disclosure provides a solution for this need.

SUMMARY

A method of making a fluid injection component for a gas turbine engine includes depositing material onto a piece of tube stock. The method includes machining an elbow into the deposited material, wherein machining the elbow includes forming a joint surface in the deposited material.

Depositing can include laser cladding the material onto the piece of tube stock. The piece of tube stock can be a feed arm of a fluid injector. Depositing material can include depositing material to cover over an end of the piece of tube stock. Depositing material can include depositing material around a whole circumference of an outer surface of the piece of tube stock. Depositing material can include depositing the material to form a fillet interface with the piece of tube stock. Forming the joint surface can include machining the joint surface to be lateral to the piece of tube stock.

Machining can include forming a fluid passage through the deposited material and through a lateral wall of the piece of tube stock in fluid communication with a main fluid passage in the piece of tube stock. The method can include brazing a fluid nozzle to the joint surface of the deposited material. The fluid passage can extend from the piece of tube stock, through the elbow, and into the nozzle component. The method can include forming a bend in the piece of tube stock. Machining can include forming a second joint surface in the deposited material. The method can include brazing a heat shield to the second joint surface.

A fluid injector includes a feed arm and an elbow, and a metallurgical joint joining the feed arm to the elbow. The metallurgical joint includes a metallurgical crystal structure including only one boundary that has a crystal structure between the feed arm and laser clad material of the elbow.

The boundary can be devoid of braze. A nozzle component can be brazed to the elbow. A second metallurgical joint can join the nozzle component to the elbow. The second metallurgical joint can include a first metallurgical boundary between the elbow and a braze material, and a second metallurgical boundary between the braze material and the nozzle component.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 7-8 are a schematic cross-sectional elevation views of continued stages of the process of FIGS. 1-6;

FIG. 9 is a schematic cross-sectional elevation view of another embodiment of a fluid tube and nozzle assembly in accordance with the present disclosure;

DETAILED DESCRIPTION OF THE PREFERRED EMBODIMENTS

Figure 1:
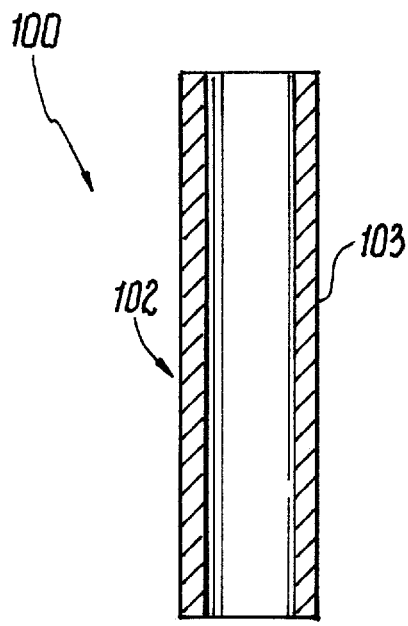
FIGS. 1-3 are schematic cross-sectional elevation views of respective stages in a process in accordance with the present disclosure, showing deposition of material for forming a joint for a fluid nozzle and feed tube.

Reference will now be made to the drawings wherein like reference numerals identify similar structural features or aspects of the subject disclosure. For purposes of explanation and illustration, and not limitation, a partial view of an embodiment of a fluid injector in accordance with the disclosure is shown in FIG. 1 and is designated generally by reference character 100. Other embodiments of systems in accordance with the disclosure, or aspects thereof, are provided in FIGS. 2-11, as will be described. The systems and methods described herein can be used to facilitate manufacture of injection components, while reducing part count and weight. Fluid as used herein can include any suitable fluid such as liquid fuel, gas fuel, air, or the like.

Figure 2:
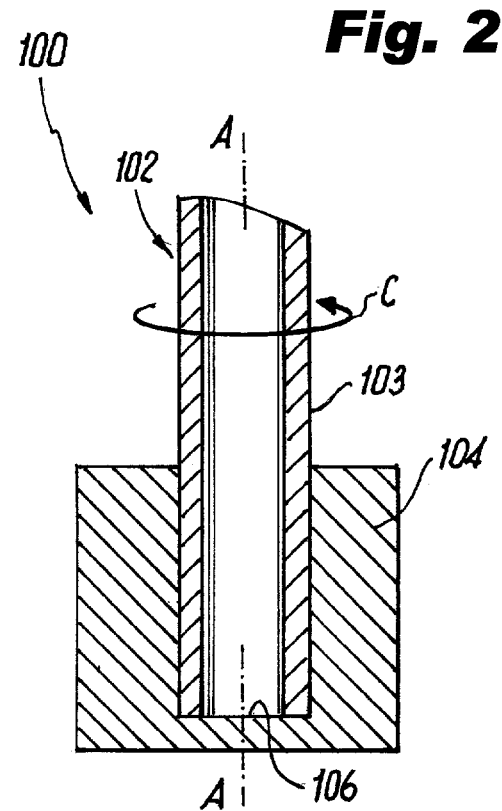

A method of making a fluid injection component for a gas turbine engine, e.g. a fluid injector 100 in FIG. 8, includes starting from a piece of tube stock 102, which can ultimately serve as a feed arm of a fluid injector 100 (as shown in FIG. 8). As shown in FIG. 2, the method includes depositing material 104 onto the piece of tube stock 102. Depositing includes laser cladding the material 104 onto the piece of tube stock 102. The material 104 is deposited about the full circumference C of an outer surface 103 of the piece of tube stock 102, relative to the longitudinal axis A of the piece of tube material A. While laser cladding is discussed herein, those skilled in the art will readily appreciate that any other suitable deposition process can be used such as (but not limited to) electron beam cladding, cold spaying, or plasma spraying. The material 104 is also deposited to cover over an end 106 of the piece of tube stock 102 to close off the end 106 so fluid cannot flow out the end 106.

Figure 3:
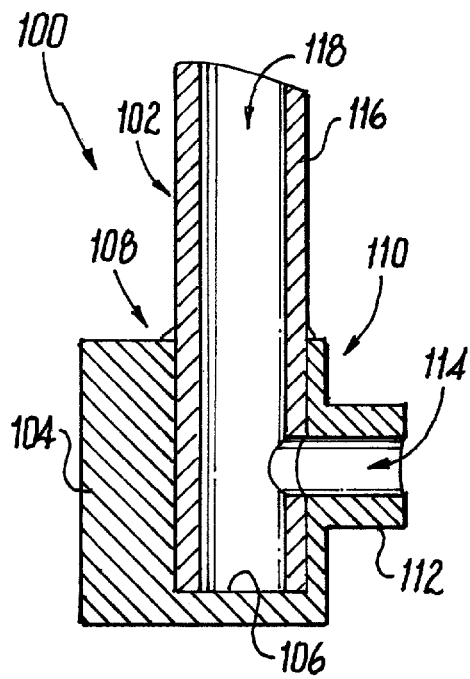

With reference now to FIG. 3, the method includes machining the deposited material 104 into an elbow 110. This includes forming a braze joint surface 112 in the deposited material 104, which is oriented lateral to the axis A of the piece of tube stock 102. While brazing is discussed herein, those skilled in the art will appreciate that any suitable joining process, such as welding, can be used. A fillet interface 108 with the piece of tube stock 102 can be formed in the deposited material 104, either by the cladding process, or by cladding extra material 104 and machining it down to the fillet interface 108. The fillet interface 108 strengthens the connection of the piece of tube stock 102 and the elbow 110.

Figure 4:
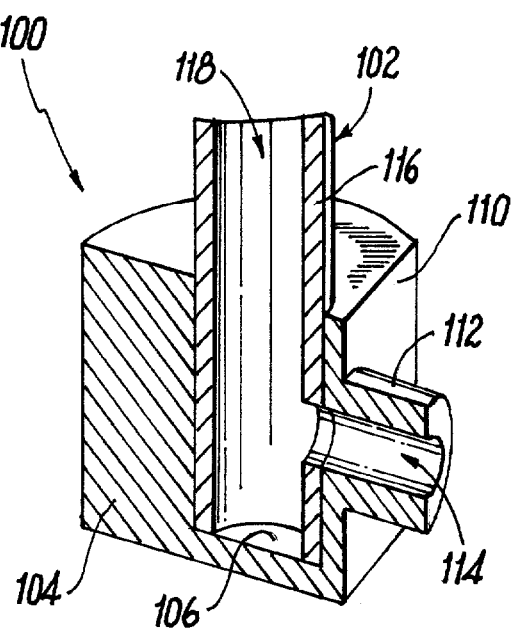
FIG. 4 is a schematic cross-sectional perspective view of the assembly of FIG. 3.
Figure 5:
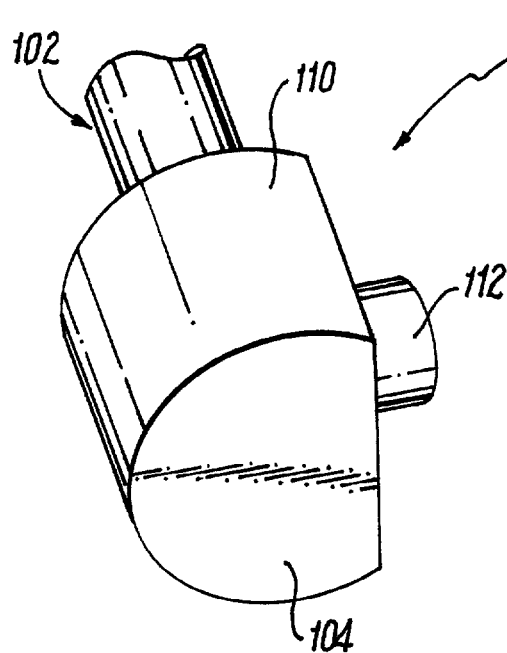
FIGS. 5-6 are schematic perspective views of continued stages of the process of FIGS. 1-4.
Figure 6:
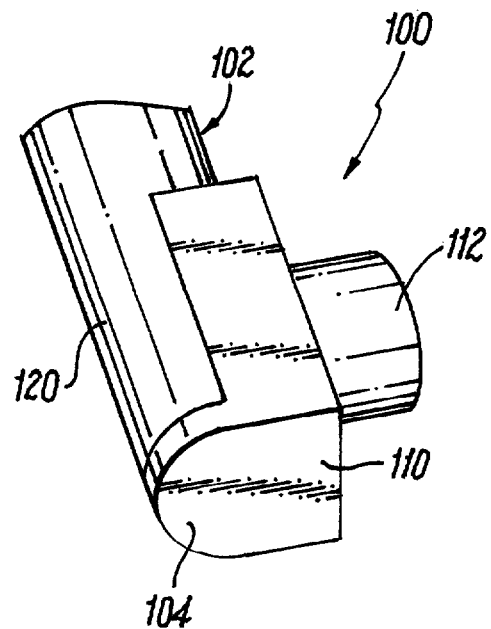

With reference now to FIG. 4, machining the deposited material 104 includes forming a fluid passage 114 through the deposited material 104 and through a lateral wall 116 of the piece of tube stock 102. The passage 114 is in fluid communication with the main fluid passage 118 in the piece of tube stock 102. FIG. 5 shows the deposited material 104, which can be further machined down to the form in FIG. 6, even exposing a portion 120 of the piece of tube stock 102 that had been covered by the deposited material 102.

Figure 7:
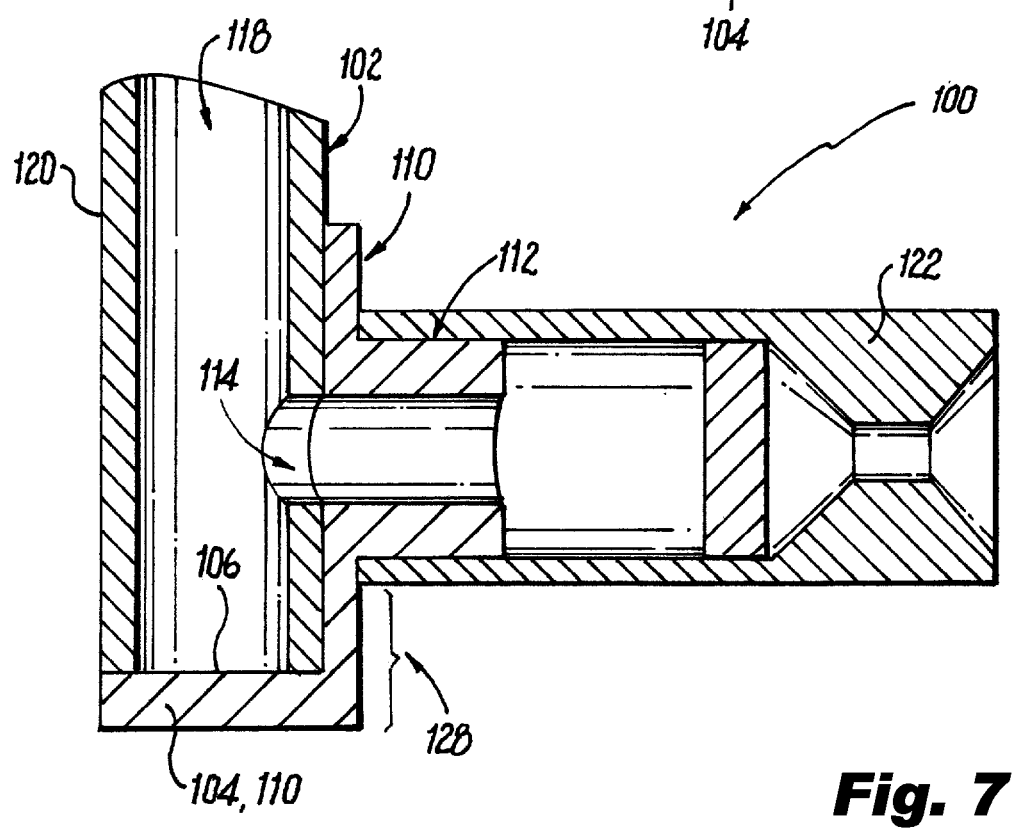

Referring now to FIG. 7, the method includes brazing a fluid nozzle 122 to the braze joint surface 112 of the deposited material 104. The fluid passage 114 extends from the main fluid passage 118 of the piece of tube stock 102, through the elbow 110, and into the nozzle component 122. As shown in FIG. 8, the method can include forming a bend in the piece of tube stock 102 as indicated by the curved double arrow.

Figure 10:
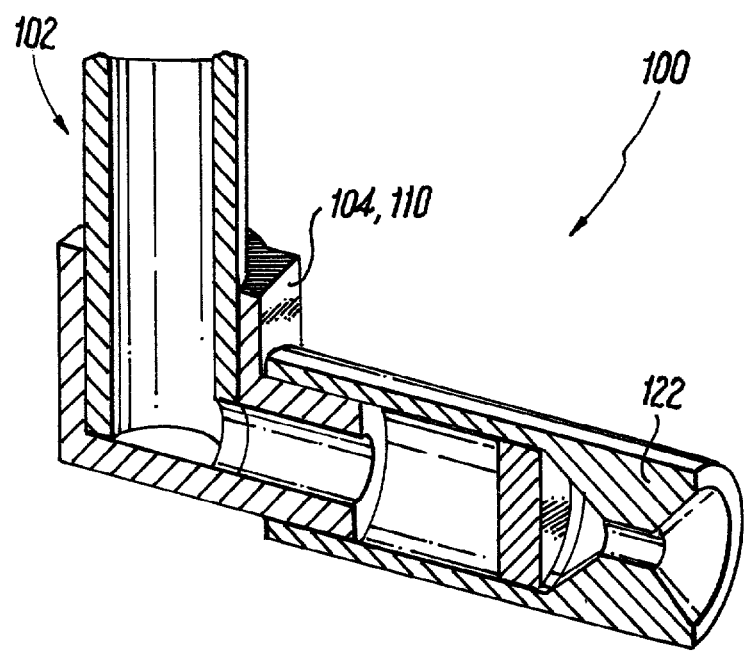
FIG. 10 is a schematic cross-sectional perspective view of another embodiment of a fluid tube and nozzle assembly in accordance with the present disclosure.

With reference now to FIG. 9, in applications where a heat shield 124 is desirable, machining the deposited material 104 can include forming a second braze joint surface 126 in the deposited material 104. The method can include brazing a heat shield 124 to the second braze joint surface 126. It is also contemplated that in lieu of a braze joint, the laser cladding process could be used to weld the heat shield 124 directly to the fluid nozzle assembly. As shown in FIG. 10, it is also contemplated that the chin portion 128 identified in FIG. 7 can be shortened or eliminated as shown in FIG. 10, for a more compact form factor.

Figure 11:
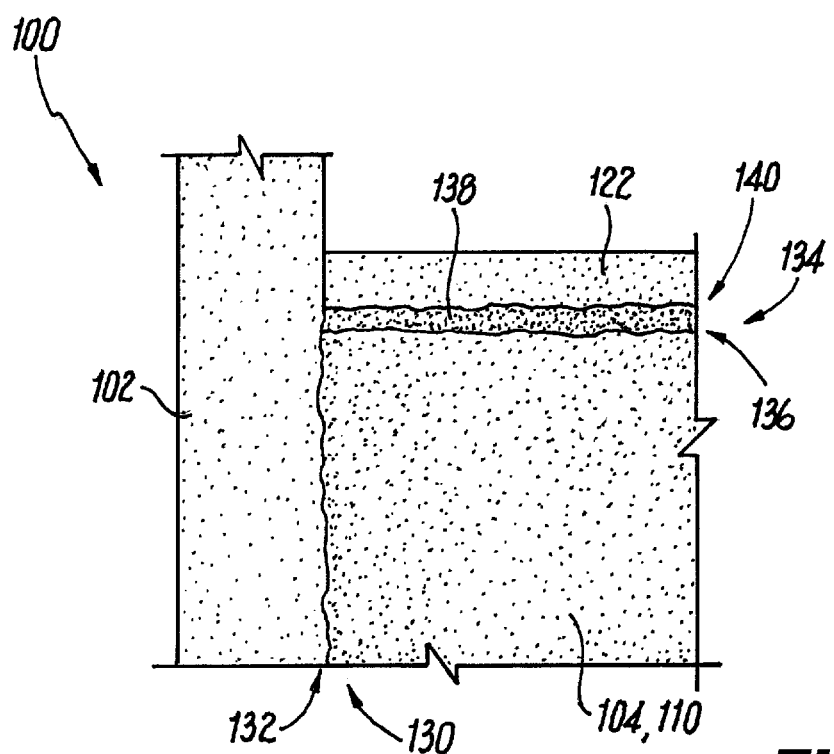
FIG. 11 is is a schematic cross-sectional view of a metallurgical joint in accordance with the present disclosure, showing the metallurgical boundary between the tube of feedstock and the deposited material.

With reference now to FIG. 11, a metallurgical joint 130 joins the feed arm/piece of tube stock 102 to the elbow 110. The metallurgical joint 130 includes a metallurgical crystal structure including only one boundary 132 that has a crystal structure, between the feed arm/piece of feed stock 102 and deposited material 104 of the elbow 110. The crystal structure boundary 132 can be devoid of braze. A second metallurgical joint 134 joins the nozzle component 122 to the elbow 110. The second metallurgical joint 134 includes a first metallurgical crystal structure boundary 136 between the elbow 110 and braze material 138. A second metallurgical crystal structure boundary 140 between braze material 138 and the nozzle component 122.

Systems and methods as disclosed herein can reduce part count, reducing cost and weight of fluid injection components. They can also allow use for lower cost materials (such as use of stock tubes). Waste material can be reduced or minimized relative to machining an entire piece of stock material down to make the feed tube and elbow from a single piece of stock material.

The methods and systems of the present disclosure, as described above and shown in the drawings, provide for facilitated manufacture of fluid injection components while reducing part count and weight. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of making a fluid injection component for a gas turbine engine comprising:
   depositing material onto a piece of tube stock; and
   machining an elbow into the deposited material, wherein machining the elbow includes forming a joint surface in the deposited material, wherein depositing material includes depositing material to cover over an end of the piece of tube stock so fluid cannot flow out the end of the piece of tube stock.

2. The method as recited in claim 1, wherein depositing includes laser cladding the material onto the piece of tube stock.

3. The method as recited in claim 1, wherein the piece of tube stock is a feed arm of a fluid injector.

4. The method as recited in claim 1, wherein depositing material includes depositing material around a whole circumference of an outer surface of the piece of tube stock.

5. The method as recited in claim 1, wherein forming the joint surface includes machining a braze joint surface to be lateral to the piece of tube stock.

6. The method as recited in claim 1, further comprising joining a fluid nozzle to the joint surface of the deposited material.

7. The method as recited in claim 1, wherein machining includes forming a fluid passage through the deposited material and through a lateral wall of the piece of tube stock in fluid communication with a main fluid passage in the piece of tube stock.

8. The method as recited in claim 7, further comprising brazing a fluid nozzle to a braze joint surface of the deposited material, wherein the fluid passage extends from the piece of tube stock, through the elbow, and into a nozzle component.

9. The method as recited in claim 1, further comprising forming a bend in the piece of tube stock.

10. The method as recited in claim 1, wherein machining includes forming a second braze joint surface in the deposited material and further comprising brazing a heat shield to the second braze joint surface.

11. The method as recited in claim 1, wherein depositing material includes depositing the material to form a fillet interface with the piece of tube stock.

\* \* \* \* \*